(12) United States Patent
Kopecky et al.

(10) Patent No.: US 7,666,013 B1
(45) Date of Patent: Feb. 23, 2010

(54) ADAPTER FOR MOTOR LEAD EXTENSION TO ELECTRIC SUBMERSIBLE PUMP

(75) Inventors: Trevor Kopecky, Dayton, TX (US); Edwin Gross, Houston, TX (US)

(73) Assignee: Borets Company LLC, Moscow (RU)

( * ) Notice: Subject to any disclaimer, the term of this patent is extended or adjusted under 35 U.S.C. 154(b) by 0 days.

(21) Appl. No.: 12/254,071

(22) Filed: Oct. 20, 2008

(51) Int. Cl.
*H01R 13/53* (2006.01)
(52) U.S. Cl. .................. 439/191; 417/423.3
(58) Field of Classification Search ............ 439/91, 439/92, 94, 191, 192, 194; 417/423.3
See application file for complete search history.

(56) References Cited

U.S. PATENT DOCUMENTS

| | | | |
|---|---|---|---|
| 5,221,214 A * | 6/1993 | Martin | 439/191 |
| 5,478,970 A | 12/1995 | Lawler et al. | |
| 5,567,170 A | 10/1996 | Kroeber | |
| 5,700,161 A * | 12/1997 | Plummer et al. | 439/587 |
| 5,860,792 A * | 1/1999 | Marks | 417/366 |
| 5,973,270 A | 10/1999 | Keller | |
| 6,193,474 B1 | 2/2001 | Tetzlaff | |
| 6,409,485 B1 * | 6/2002 | Ebner | 417/423.1 |
| 6,666,664 B2 * | 12/2003 | Gross | 417/423.3 |
| 6,676,447 B1 | 1/2004 | Knox | |
| 6,780,037 B1 * | 8/2004 | Parmeter et al. | 439/191 |
| 7,264,494 B2 | 9/2007 | Kennedy et al. | |
| 2006/0222529 A1 | 10/2006 | Watson et al. | |
| 2007/0046115 A1 * | 3/2007 | Tetzlaff et al. | 310/71 |
| 2007/0224057 A1 * | 9/2007 | Swatek et al. | 417/414 |

FOREIGN PATENT DOCUMENTS

WO    WO01/39353 A1    5/2001

OTHER PUBLICATIONS

F.J.S. Alhanati, S.C. Solanki, & T.A. Zahacy; "ESP Failures: Can We Talk the Same Language?;" SPE; Apr. 2001.
J. Tovar, C. Webster, J. Dwiggins, & S. Conner; "Recent Advances in Coiled Tubing Deployed ESP';" ESP Workshop Houston, Apr. 2000.

* cited by examiner

*Primary Examiner*—Gary F. Paumen
(74) *Attorney, Agent, or Firm*—Wong, Cabello, Lutsch, Rutherford & Brucculeri LLP

(57) ABSTRACT

An adapter for a motor head of an electric submersible pump enables a motor head having a pothole and cutaway to provide a direct-connect for a motor lead extension cable run downhole to the motor section of the pump. The adapter has a curved conduit independent of the motor head that positions adjacent the side of the motor head in the provided cutaway. The conduit's downhole end affixes (bolts) to the motor head with the end disposing in the pothole of the motor head. The conduit's uphole end affixes (bolts) adjacent the uphole end of the motor head. A termination block disposed in the conduit's uphole has sockets that are electrically connected to motor components via internal leads running through the conduit and the pothole. A mating termination on the end of a motor lead extension cable affixes (bolts) to the conduit's uphole end, and pin on the termination electrically couple to the sockets to convey power to the motor section.

28 Claims, 4 Drawing Sheets

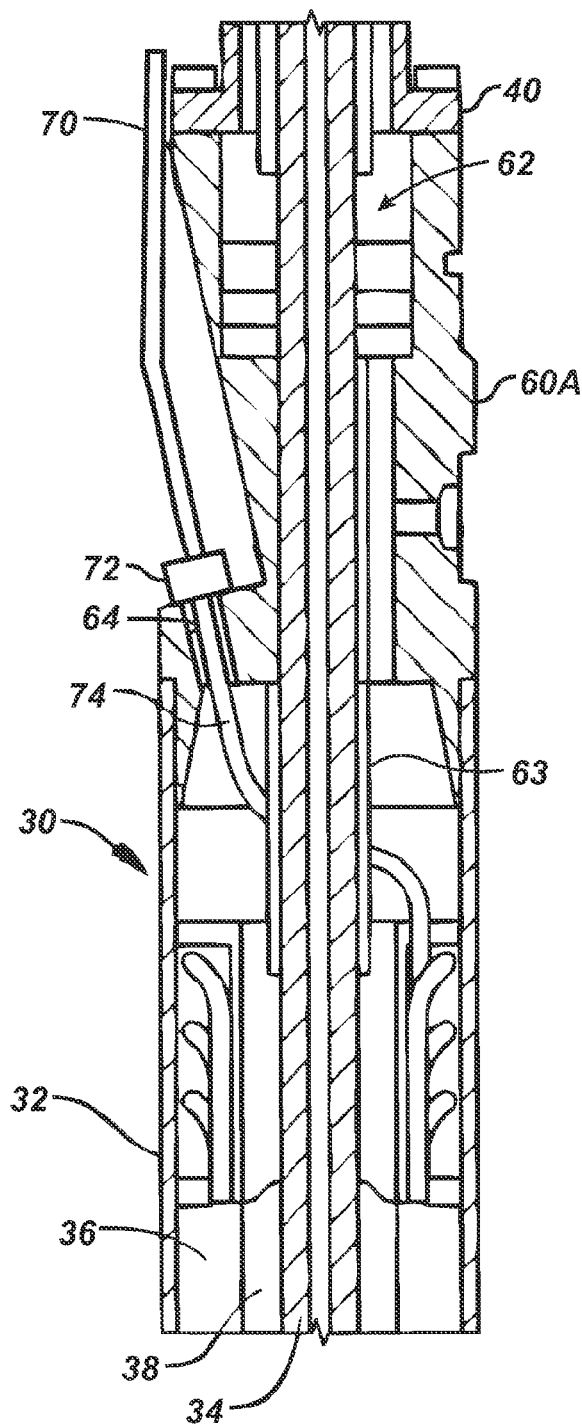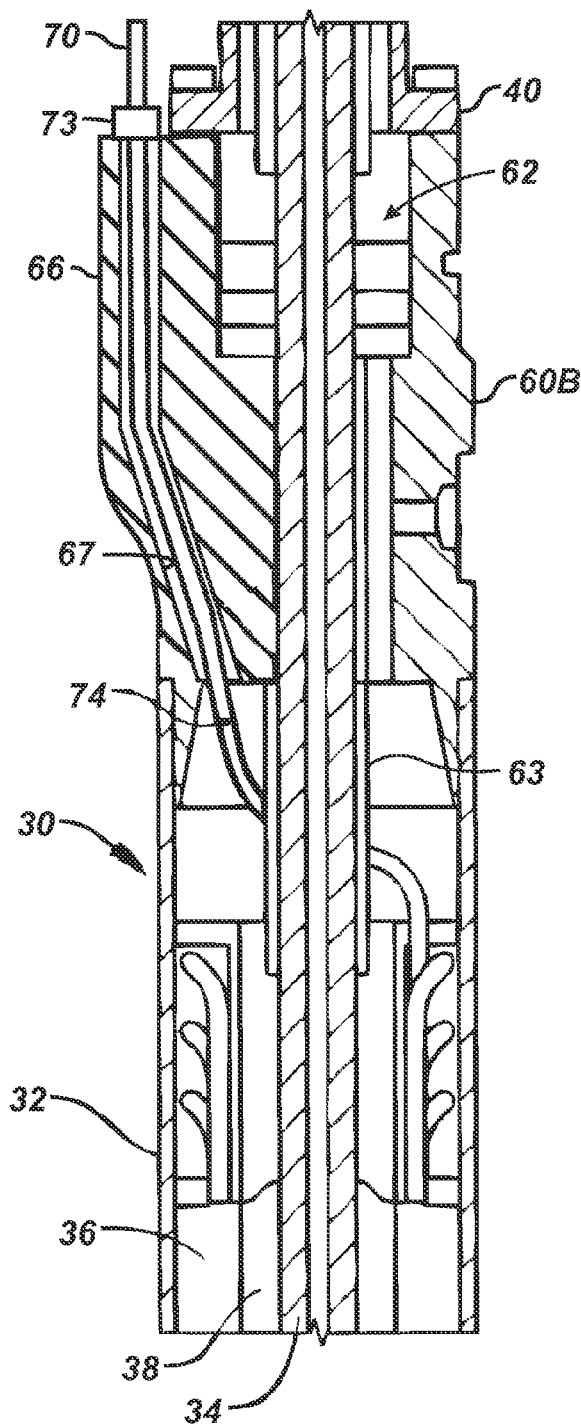
FIG. 2A
(Prior Art)
FIG. 2B
(Prior Art)

US 7,666,013 B1

ADAPTER FOR MOTOR LEAD EXTENSION TO ELECTRIC SUBMERSIBLE PUMP

BACKGROUND

A typical electrical submersible pump (ESP) system 20 shown in FIG. 1 suspends from production tubing 16 in a wellbore casing 14 that penetrates a formation. A motor section 30 located on the bottom of the ESP system 20 operates a pump section 50. A seal section 40 positioned between the motor and pump sections 30 and 50 equalizes pressure in the motor section 30 with the external hydrostatic pressure. The pump section 50 connects to the production tubing 16 by a discharge head and has one or more pumps to lift fluid into the production tubing 16. The pumps in this section 50 can include centrifugal pumps, gear pumps, vane pumps, progressive cavity pumps, or the like and can have several stages.

To provide power and control to the motor section 30, a switchboard or variable-frequency drive (VFD) 22 at the surface connects to a junction box 24, and a surface cable 26 connects from the junction box 24 to the wellhead 12. The surface cable 26 then passes through a penetrator at the wellhead 12 and is now called an electric submersible pump (ESP) cable 28. The ESP cable 28 extends within the casing 14 down the length of the production tubing 16 and 28 is typically banded or strapped to the production tubing 16 at various intervals. Most of the length of the cable 28 has a round configuration. At some point near the pump section 50, the round ESP cable 28 is spliced by a splice component 29 to a flatter cable 70, typically called a motor lead extension (MLE) cable. The flatter MLE cable 70 is better suited to fit in the annulus between the pump section 30 and the casing 14 where the clearances can be very tight and where damage to the MLE cable 70 can occur. At a motor head 60, the MLE cable 70 connects to the head's pothead 62 and supplies electrical power to the motors in the motor section 30. Multiple motors may be stacked in tandem in the motor section 30 depending on the number of pump stages and the like used in the system 20.

In use, the VFD 22 receives power from a utility grid or generator (not shown). When the ESP system 20 is started, the motor section 30 draws the required voltage via the cables 28 and 70 and generates pump rotation. As the fluid comes into the well through the casing's perforations, the fluid passes the motor section 30 and the seal section 40 and enters the pump's intake 52. Inside, each pump stage (impeller/diffuser combination) adds pressure or head to the fluid at a given rate. Eventually, the fluid builds up enough pressure as it reaches the top of the pump section 50 so the fluid can be lifted to the surface through the production tubing 16.

As is known, the MLE cable 70 has conductors, insulation, barriers, jackets, armor, and the like, and these components can be arranged in different configurations depending on the implementation and the required power capacity. For example, the MLE cable 70 usually has a rigid outer jacket of stainless steel or galvanized steel armor that encloses several (e.g., three) inner cable legs. Typically, the MLE cable 70 has a flat configuration with the individual cable legs positioned side-by-side in the outer jacket, although other arrangements are also used.

Two or more electrical motors are typically connected in tandem to drive large pumps, and the motors can usually be three-phase, AC motors. The motors come in single, upper, center and lower tandem sections. Because the MLE cable 70 provides power to the ESP motors, failure in the cable 70 or its connection to the head 60 will prevent the ESP system 20 from operating properly (if at all). Therefore, it is important that the connection of the MLE cable 70 to the motor head 60 minimizes potential damage to the MLE cable 70 during installation and operation so the ESP system 20 will have optimum runlife.

In FIG. 2A, a typical upper tandem motor head 60A is shown for a motor section 30 of an ESP system. The head 60A connects to the seal section 40 above and connects to a tubular housing 32 of the motor section 30 below. A drive shaft 34 interconnected between the motor and seal sections 30/40 passes through the head's central passage 62. A guard sheath 63 separates portion of the shaft 34 from the interior of the motor section 30, and upper and lower bushings may be used to support the shaft 34 in the head 60A. Within the motor section 30, the shaft 34 has a rotor 38 positioned within a stator 36 of an electric motor, which may be a three-phase motor requiring three electrical conductors. The MLE cable 70 connects to the pothole 64 in the side of the head 60A via a pothead connector 72. From the pothead connector 72, internal conductors 74 then connect internally to the components of the motor section 30 to power the motors.

The connection of the MLE cable 70 to the upper tandem motor head 60A in FIG. 2A represents a typical configuration that uses the pothead 64 in the side of the motor head 60A for connection of the MLE cable 70. As an alternative to this configuration, the upper tandem motor head can be designed with a "pregnant" or "goitered" configuration to provide a direct-connect for the MLE cable 70.

FIG. 2B show an example of a "pregnant" or "goitered" upper tandem motor head 60B. As shown, the head 60B has many of the same components as the previous head 60A so that like reference numbers are used for the same components. The body of this pregnant head 60B is different, however. As shown, the head 60B has a bulging portion 66 with a channel 67. The MLE cable 70 connects with a direct connection 73 to the bulge's channel 67, and conductors 74 pass through the channel 67 to components of the motor section 30. Due to the required dimensions and physical characteristics of this type of head 60B, the head 60B has to be initially cast and then machined to obtain the finished part with the unique bulging portion 66 and channel 67. This type of head 60B must also be uniquely designed for a particular implementation, which increases the cost required to manufacture this more complicated type of motor head 60B.

What is needed is a way for virtually any type of upper tandem motor head (either new or used) to be easily converted into a direct-connect head for motor lead extensions so as to eliminate the cost of configuring a "unique" head for each implementation and to provide greater flexibility in meeting the needs of a given installation.

BRIEF DESCRIPTION OF THE DRAWINGS

FIG. 2A illustrates an upper tandem motor head for an electric submersible pump according to the prior art.

FIG. 2B illustrates a "pregnant" or "goitered" upper tandem motor head according to the prior art.

DETAILED DESCRIPTION

Figure 1:
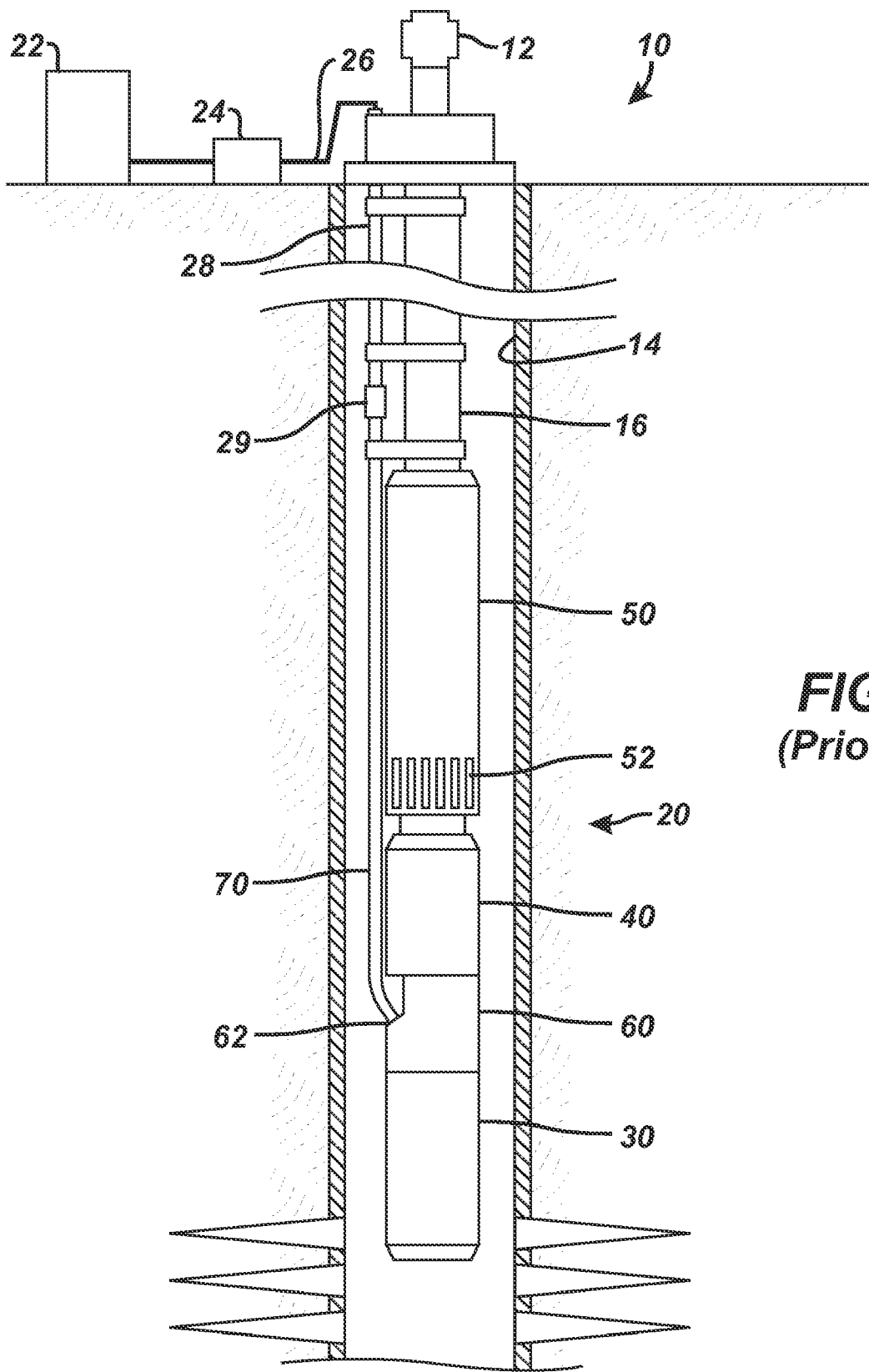
FIG. 1 illustrates a typical electric submersible pump system.
Figure 3A:
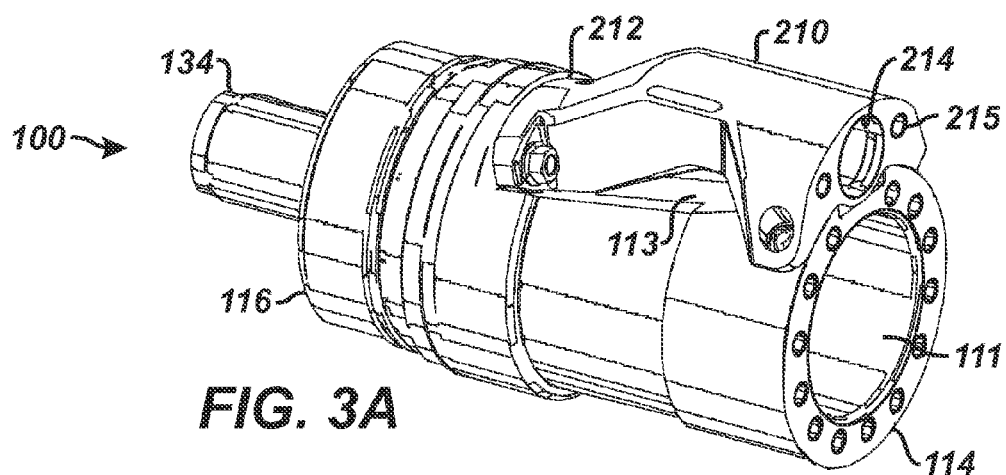
FIG. 3A illustrates a perspective view of an upper tandem motor head and a direct-connect adapter for a motor lead extension cable.
Figure 3B:
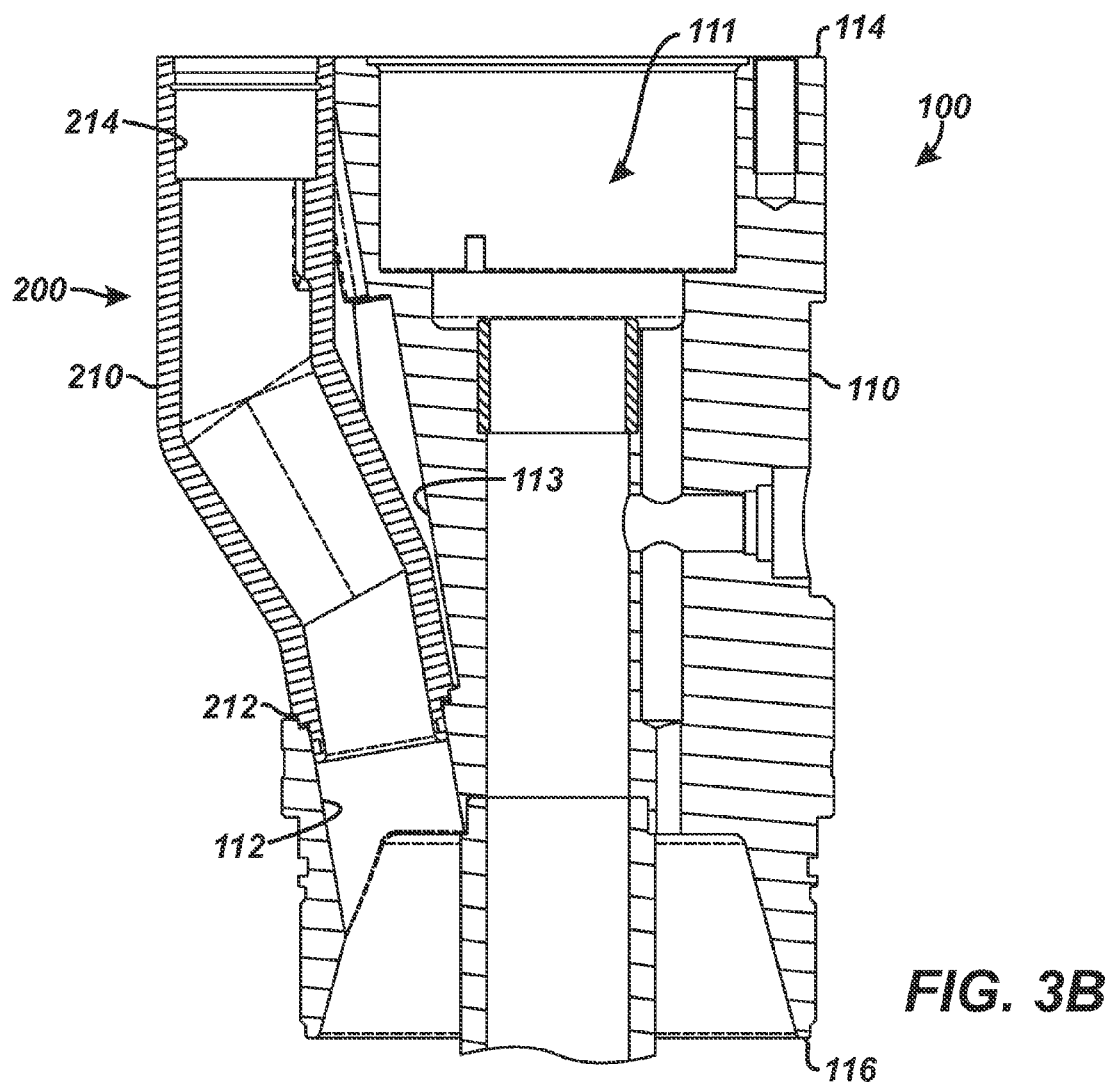
FIG. 3B illustrates a cross-sectional view of the direct-connect adapter and motor head of FIG. 3A.

Referring to FIGS. 3A-3B, a direct-connect adapter 200 provides a direct-connection of a motor lead extension cable (not shown) to an upper tandem motor head 100. As shown, the head 100 represents a conventional upper tandem motor head and has many of the same components as a conventional head. Briefly, the head 100 has a body 110 defining a central passage 111. The body 110 also has an upper flange 114 for connecting to a seal section (not shown) and has a lower rim 116 for connecting to a motor section's housing (not shown). In addition, the head's body 110 has a pothole 112 and cutaway 113 providing for a conventional form of connecting a MLE cable (not shown) to the head 100.

Rather than the conventional form of connection, the direct-connect adapter 200 provides a direct MLE connection for the conventional motor head 100. The direct-connect adapter 200 includes a conduit 210 that affixes to the head's body 110 on the side of the existing cutaway 113 for the pothole 112. As best shown in FIG. 3A, the conduit's downhole end 212 and uphole end 214 each bolt to the head's body 110 to secure the direct-connect adapter 200 to the head 100. As best shown in FIG. 3B, the conduit's downhole end 212 also fits partially into the existing tape-in pothole 112 on the head 100 using a seal or the like, and the curved shape of the conduit 210 communicates the pothole 112 to the conduit's uphole end 214 positioned adjacent the head's upper flange 114. At this uphole end 214 and as discussed in more detail below, the direct-connect adapter 200 has an exposed opening for direct connection to an MLE cable (not shown) and has bolt holes 215 on either side for connecting to header components of the MLE cable.

Figure 4:
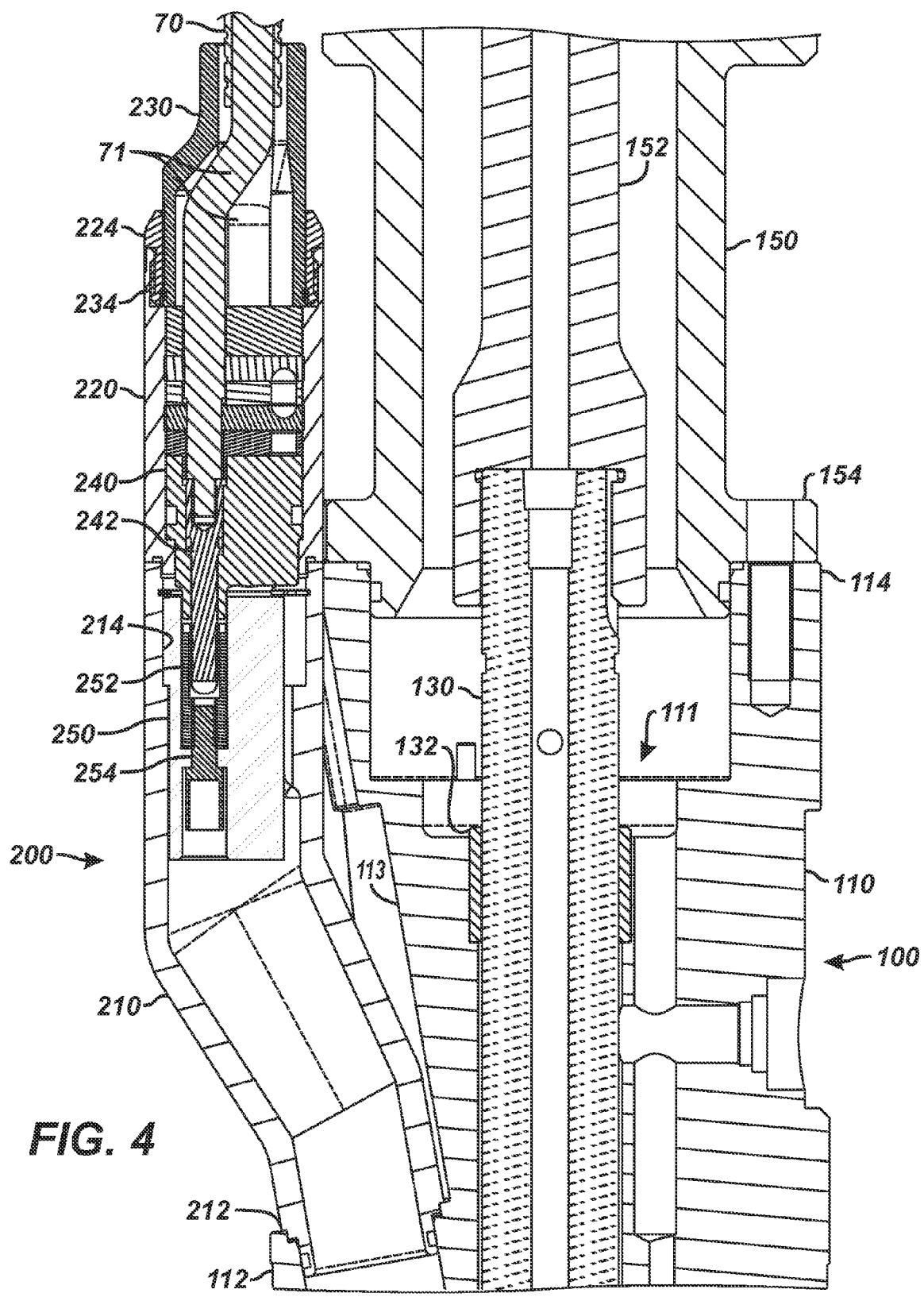
FIG. 4 illustrates a cross-sectional view of the adapter and motor head of FIG. 3A along with components of a termination block.

Turning to FIG. 4, additional components of the direct-connect adapter 200 are illustrated in cross-sectional view in conjunction with components of the motor head 100 and an MLE cable 70. For additional illustration, a seal section sub 150 is shown having a flange 154 connected to the upper flange 114 of the head 110, and the sub 150 has an upper shaft 152 that connects with a motor shaft 130 passing through the head's central passage 111 and supported by a bushing 132.

Again, the conduit 210 of the direct-connect adapter 200 is shown affixed to the side of the head's body 110 in the cutaway 113 and positioned in the pothole 112. On the conduit's uphole end 214, the conduit 210 contains a termination block 250 installed therein. The block 250 has a socket contact 252 and a conductor sleeve 254. Because the MLE cable 70 may have several (e.g., three) cable legs, the block 250 has a comparable number of contacts 252 and sleeves 254. From the sleeves 254, internal conductors (not shown) pass through the conduit 210 and into the head's pothole 112 for connection to the internal motor components (not shown).

As shown, the curved conduit 210 positions the termination block 250 adjacent the head's upper end 114 where the termination block 250 can be easily accessed and connected to the motor lead extension cable 70. The face of the termination block 250 can be positioned flush with the head's top flanged end 114, although the face may actually be recessed or extended slightly within a reasonable amount acceptable to one skilled in the art to allow for efficient installation and connection of the components.

The MLE cable 70 has a mating termination 220 on its distal end. This mating termination 220 bolts to the uphole end 214 using bolts and the bolt holes (215; FIG. 3A) formed in the conduit's uphole end 214. A cable protector 230 couples to the end of the mating termination 220 and helps protect the connection of the MLE cable 70 to the mating termination 220.

Inside, the mating termination 220 contains a direct-connect plug 240 having conductor pins 242 connected to the conductor legs 71 of the MLE cable 70. The cable's conductor legs 71 are separated and spread out from one another inside the mating termination 220 and are held by several conventional components, such as insulators and the like. When the mating termination 220 is affixed to the conduit's uphole end 214 on the direct-connect adapter 200, the plug's pins 242 insert into the socket contacts 252 of the termination block 250. In turn, the mated pins 242 and contacts 252 communicate power from the MLE cable's conductors 71 to the additional conductors (not shown) that pass through pothole 112 and to the motor components disposed in the rest of the motor housing (not shown) according to techniques known in the art.

To adapt the conventional motor head 100 having the pothole 112 and cutaway 113 for this type of direct MLE connection, threaded bolt holes can be drilled and tapped near the pothole 112 and near the uphole end 114 of the motor head 100, if not already present. Then, the conduit 210 can be affixed to the motor head 100 by bolting the downhole end 212 to the pothole 112 and the head's uphole end 214 to the head's flanged end 114. When fabricated, the size, shape, and bend of the conduit 210 can be readily configured to fit the conventional motor head on which it is to be used.

Continuing with the assembly, conductor leads (not shown) from the motor section can be run up through the conduit 210 and connected to the termination block 250 using known termination techniques, and the block 250 can be installed in the conduit 210. Likewise, the mating termination 220, cable protector 230, and plug 240 can be connected to the MLE cable 70 using standard termination techniques. Finally, to make the direct connection, the pins 242 of the plug 240 can be inserted into the block's sockets 252, and the mating termination 240 can be bolted to the uphole end 214 of the conduit 210 using bolts in the bolt holes (215; FIG. 3A).

As evidenced above, the direct-connect adapter 200 affixes to a conventional type of upper tandem motor head 100 and provides a direct-connect type of MLE connection to the head 100 without requiring a bulging or pregnant portion to be predesigned on the head as found in the prior art. In this way, the direct MLE connection provided by the adapter 200 allows for quicker system installation at the well site. The direct-connect adapter 200 also allows for any existing upper tandem motor head originally configured to receive a standard MLE type of connection (using a pothole) to be quickly converted to receive a high-current direct-connect MLE cable instead. Being able to adapt a conventional motor head for such a direct MLE connection reduces the number of different styles of motor heads that must be specifically manufactured for various implementations and kept in a well operator's inventory. Therefore, the direct-connect adapter 200 used in this way can convert most upper tandem motor heads (either new or used) quickly and easily into a direct-connect type of motor head. This adaptability not only eliminates the inventory cost of configuring unique "pregnant" heads as in the prior art, but allows for greater flexibility in meeting customer needs.

The adapter's conduit 210 can be composed of the same material as the motor head 100 or the mating termination 220 (if different). The components of the termination block 250 and direct-connect plug 240 can use features of existing quick connections known and used in the art for electrical submersible pumps. Various details related to the termination block 250, plug 240, pins 242, sockets 252, insulating materials, etc. can be found in U.S. Pat. No. 7,264,494, which is incorporated herein by reference in its entirety.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An electric submersible pump motor head adapter mechanism, comprising:
   a conduit having first and second ends and defining an internal passage therein, the first end affixable to a pothole in a motor head of an electric submersible pump, the second end positionable adjacent an uphole end of the motor head, the internal passage communicating the second end with the pothole; and
   a termination block disposed in the conduit and having one or more first contacts, the first contacts coupleable to one or more second contacts of one or more conductors of a motor lead extension cable.

2. The mechanism of claim 1, wherein the first end of the conduit comprises one or more holes receiving bolts affixable to threaded bolt holes in the motor head adjacent the pothole.

3. The mechanism of claim 1, wherein the second end of the conduit comprises one or more holes receiving bolts affixable to threaded bolt holes in the motor head adjacent the uphole end.

4. The mechanism of claim 1, wherein the second end of the conduit comprises one or more threaded holes receiving bolts affixable therein for connecting to a mating termination having the one or more second contacts.

5. The mechanism of claim 1, wherein the first contacts comprise socket contacts.

6. The mechanism of claim 5, wherein the socket contacts receive pin contacts insertable therein.

7. The mechanism of claim 1, wherein the conduit has a curved profile with the second end shifted from the first end to position adjacent a widened uphole end of the motor head.

8. An electric submersible pump motor head, comprising:
   a head body having an uphole end, a downhole end, and a side, the side defining a pothole communicating into the body;
   a conduit independently affixable to the head body, the conduit having first and second ends, the first end positionable adjacent the pothole in the side of the head body, the second end positionable adjacent the uphole end of the head body; and
   a termination block disposed in the conduit and having one or more first contacts, the first contacts electrically coupleable to one or more conductors of a motor lead extension cable.

9. The motor head of claim 8, wherein the motor head comprises threaded bolt holes adjacent the pothole, and wherein the first end of the conduit comprises one or more holes receiving bolts affixable to the threaded bolt holes.

10. The motor head of claim 8, wherein the motor head comprises threaded bolt holes adjacent the uphole end, and wherein the second end of the conduit comprises one or more holes receiving bolts affixable to threaded bolt holes.

11. The motor head of claim 8, further comprising a mating termination affixable to the second end of the conduit, the mating termination having one or more second contacts electrically connected to the one or more conductors of the motor lead extension cable, the second contacts coupleable to the one or more first contacts of the termination block.

12. The motor head of claim 11, wherein the second end of the conduit comprises one or more threaded holes receiving bolts therein for affixing to the mating termination.

13. The motor head of claim 11, wherein the first contacts comprise socket contacts.

14. The motor head of claim 11, wherein the second contacts comprise pin contacts insertable into the socket contacts.

15. The motor head of claim 8, wherein the conduit has a curved profile with the second end shifted from the first end to position adjacent a widened uphole end of the motor head.

16. An electric submersible pump motor, comprising:
   a housing having an electric motor and a drive shaft;
   a motor head having an uphole end, a downhole end, and a side, the downhole end coupled to the housing, the side defining a pothole communicating into the body;
   a conduit independently affixable to the motor head, the conduit having first and second ends, the first end positionable adjacent the pothole in the side of the motor head, the second end positionable adjacent the uphole end of the motor head; and
   a termination block disposed in the conduit and having one or more first contacts, the first contacts electrically coupleable to one or more conductors of a motor lead extension cable.

17. The motor of claim 16, wherein the motor head comprises threaded bolt holes adjacent the pothole, and wherein the first end of the conduit comprises one or more holes receiving bolts affixable to the threaded bolt holes.

18. The motor of claim 16, wherein the motor head comprises threaded bolt holes adjacent the uphole end, and wherein the second end of the conduit comprises one or more holes receiving bolts affixable to threaded bolt holes.

19. The motor of claim 16, further comprising a mating termination affixable to the uphole end of the conduit, the mating termination having one or more second contacts electrically connected to the one or more conductors of the motor lead extension cable, the second contacts coupleable to the one or more first contacts of the termination block.

20. The motor of claim 19, wherein the second end of the conduit comprises one or more threaded holes receiving bolts therein for affixing to the mating termination.

21. The motor of claim 19, wherein the first contacts comprise socket contacts.

22. The motor of claim 19, wherein the second contacts comprise pin contacts insertable into the socket contacts.

23. The motor of claim 16, wherein the conduit has a curved profile with the second end shifted from the first end to position adjacent a widened uphole end of the motor head.

24. A method of adapting a motor head of an electric submersible pump for direct-connection to a motor lead extension cable, the method comprising
   affixing a conduit to a pothole on a side of a motor head of an electric submersible pump;
   connecting leads from a motor through the conduit to a termination block disposed in the conduit;
   connecting one or more conductors of a motor lead extension cable to a plug having one or more first contacts;
   electrically connecting the one or more first contacts of the plug to one or more second contacts on the termination block; and
   affixing the plug to an uphole end of the conduit.

25. The method of claim 24, wherein affixing the conduit comprises bolting a downhole end of the conduit to the surface of the motor head.

26. The method of claim 24, wherein affixing the conduit comprises bolting the uphole end of the conduit to the surface of the motor head.

27. The method of claim 24, wherein electrically connecting the one or more first contacts of the plug to one or more second contacts on the termination block comprises inserting one or more pins on the plug into one or more sockets on the termination block.

28. The method of claim 24, wherein affixing the plug to the uphole end of the conduit comprises bolting a head of the plug to the uphole end of the conduit.

* * * * *